June 1, 1937.  D. B. GAUSS  2,082,623
WATER SOFTENING SYSTEM
Filed April 15, 1935

INVENTOR.
David B. Gauss
BY Chappell Earl
ATTORNEYS

Patented June 1, 1937

2,082,623

UNITED STATES PATENT OFFICE 2,082,623

WATER SOFTENING SYSTEM

David B. Gauss, Kalamazoo, Mich., assignor to H. L. G. Company, Kalamazoo, Mich.

Application April 15, 1935, Serial No. 16,400

12 Claims. (Cl. 210—24)

The main objects of this invention are:

First, to provide an improved water treating system of the type employing a water treating agent which must be regenerated from time to time.

Second, to provide a system of the foregoing character provided with adjustable means for changing the intensity of the means for introducing the generating material in accordance with various variable factors, such as the pressure of the supply water, and to provide a device readily adaptable to softening tanks of different sizes or capacities.

Third, to provide a water softening apparatus which is simple and economical in its parts and very efficient and effective in normal operation and during regeneration.

Objects relating to details and economies of my invention will appear from the description to follow. The invention is defined and pointed out in the claims.

A structure which is a preferred embodiment of my invention is illustrated in the accompanying drawing, in which.

Figures 1, 2, 3:
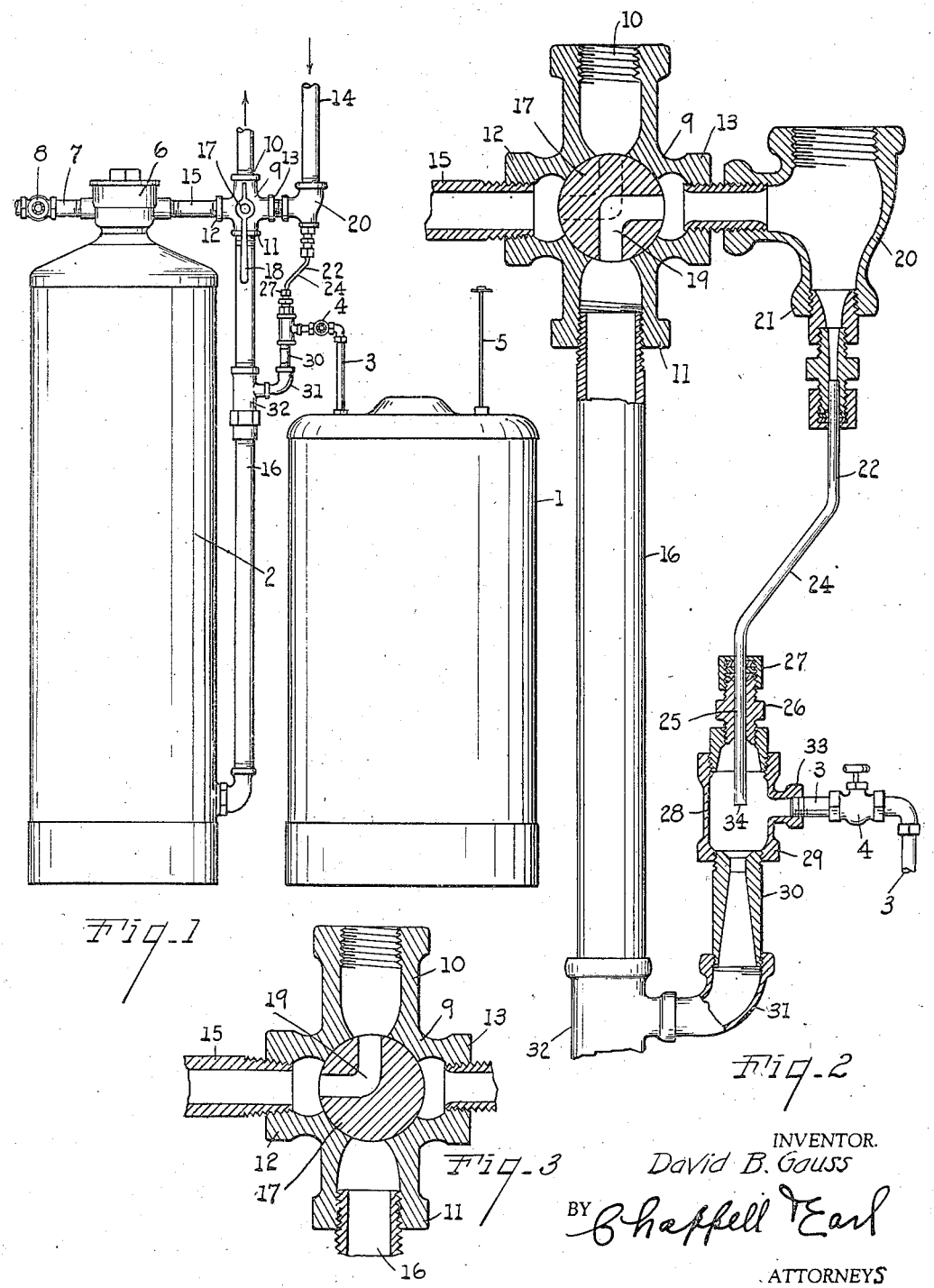
Fig. 1 is a fragmentary view in side elevation of a water softening system embodying features of my invention.
Fig. 2 is an enlarged fragmentary view mainly in section showing the parts in normal position.
Fig. 3 is a fragmentary sectional view showing the valve of the cross fitting in regenerating position.

In the illustrated embodiment of my invention, the water softening system comprises a brine tank 1 and a container 2 for a water softening mineral or agent such as zeolite. Depending into the brine tank 1 is a suction pipe 3 provided with a normally closed valve 4. The level of the salt within the tank 1 is indicated by a gage therein having a stem 5 projecting upwardly through the cover of the tank. The tank 1 may, of course, contain material other than brine for regenerating the water softening agent in the container 2.

The top of the water softening mineral container 2 is provided with a head 6 having a lateral soft water outlet 7 provided with a service closed valve 8. The valve 8 should be closed during regeneration of the water softening agent. The other side of the head 6 is connected to a cross fitting 9 having a top branch 10 connected to a drain, a bottom branch 11 connected to the bottom of the container 2, a lateral branch 12 connected to the top of the container 2, and a lateral branch 13 connected to a water supply pipe 14. The cross fitting 9 is conveniently arranged relative to the head 6 so that the lateral branch 12 is connected thereto by a relatively short pipe 15, the bottom branch 11 being connected to the bottom of the container 2 by a vertical pipe line 16.

In the cross fitting 9 is a central two-way valve 17 of the rotary type having a control handle 18. The valve 17 in normal position is adapted to close the drain and container top branches 10 and 12 as shown by Fig. 2, the port or passage 19 of the valve in this position placing the supply water and container bottom branches 13 and 11 in communication with one another. When turned to regenerating position, the valve 17, as shown by Fig. 3, closes the supply water and container bottom branches 13 and 11, and places the drain and container top branches 10 and 12 in communication with one another through the passage 19.

Connecting the water supply pipe 14 to the branch 13 of the cross fitting is a T-fitting 20 having a branch 21 of reduced diameter. To this branch 21 is connected a flexible injector water supply pipe 22 having a medial offset portion 24 for a purpose to be presently explained. The lower end portion 25 of the pipe 22 projects inwardly through a nipple 26 and a packing gland 27 into the fitting 28 of the injector 29.

The injector has a Venturi tube 30 in line with the portion 25 of the pipe 22, the Venturi tube delivering to the pipe line 16 through an elbow 31 and a T-coupling 32. The injector fitting 28 has a lateral brine inlet 33 to which is connected the brine suction pipe 3. The brine suction pipe valve 4 is normally closed, the valve being opened for regeneration.

The discharge end of the pipe 22 constitutes a nozzle 34 in line with the Venturi tube 30, the position of the nozzle 34 relative to the mouth of the Venturi tube 30 being adjustable by merely sliding the portion 25 of the pipe in the nipple 26, the offset portion 24 and the axially offset relation between the injector 29 and the T-fitting 20 permitting such manipulation. Thus, the suction of the injector may be regulated in accordance with the pressure of the water supply and other factors, as for example the adaptation of the injector device to softening tanks of different sizes or capacities.

In normal operation, the supply water flows through the supply pipe 14, T-fitting 20, branch 13 of the cross fitting 9, passage 19 of the valve 17, branch 11 of the cross fitting, piping 16 and upwardly through the container 2. A by-pass or parallel water conduit includes the branch 21 of the T-fitting 20, pipe 22, injector 29 and elbow 31. This water, after passing upwardly through the zeolite or other water softening material, is delivered to the head 6 and to the soft water outlet 7. For normal operation, the valve 4 in the brine suction pipe 3 is closed, the valve 8 in the soft water outlet 7 is open, and the valve 17 is in the position shown by Figs. 1 and 2. Thus the supply water is softened or otherwise conditioned by the chemical agent in the container 2.

When the zeolite or other material bed has exhausted its capacity or reached its limit for further treatment of the water, it must be regenerated. To do this, the handle 18 of the valve 17 is turned so that its passage 19 is in the position illustrated by Fig. 3. The water then passes only through the pipe 22 and injector 29 entering the container 2 at the bottom and passing upwardly through the zeolite and out through the passage 19 of the valve 17 to the drain or sewer. The soft water outlet valve 8 is closed at this time. The passage of the water to the injector 29 creates a partial vacuum or suction in the fitting 28, the degree of this partial vacuum or suction being regulated by adjusting the distance between the nozzle 34 and the Venturi tube 30.

With this arrangement, on the opening of the brine suction pipe valve 4, the brine or other regenerating liquid in the tank 1 is drawn therefrom into the injector fitting 28 where it mixes with the supply water and is delivered to the bottom of the container 2, passes upwardly through the material therein, and is finally discharged to the drain. When the proper amount of regenerating material has been drawn, the valve 4 is closed so that supply water passes only through the injector. This flow is allowed to continue for a sufficient period of time for the water to thoroughly rinse the zeolite of residual brine which is also discharged to the drain.

The zeolite or other water conditioning agent is thus regenerated and its original ability to soften or otherwise condition the water is restored. By turning the valve 17 back to its original normal position, Fig. 2, the container 2 is again connected so as to deliver the conditioned water to the outlet 7, the valve 8 being opened.

To add water to the brine tank, with the valve 17 in normal position, valve 4 is opened. Because water is now flowing through both piping 16 and by-pass 21, positive pressure exists in chamber 28, and fresh water will flow down through brine pipe 3 until the proper level has been restored, when valve 4 should be closed.

In the normal operation of my apparatus, the passage of the water through the injector 29 keeps the same clean and ready for action. The brine injection operation of the injector 29 is controlled exclusively by the brine suction pipe valve 4. The degree of suction in the injector is readily adjusted, as pointed out above, by sliding the portion 25 of the pipe 22 in the nipple 26 to change the position of the nozzle 34 relative to the Venturi tube 30. This is facilitated and made possible by my novel shape of the pipe 22 including the offset 24.

From the above description of my invention, it will be apparent to those skilled in the art that I provide a water softening or conditioning system that is simple and economical in its parts and very efficient and effective in operation. There is provided a minimum number of valves to be manipulated and these valves are readily adjusted for regenerating or otherwise reconditioning the water softening or conditioning material.

I have illustrated and described my improvements in an embodiment which I have found very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent is:

1. A water softening system comprising a brine tank having a valved brine suction pipe depending therein, a water softening mineral container, a cross fitting having a branch connected to a drain, a branch connected to the bottom of said container, a branch connected to the top of said container, and a branch connected to a water supply, an injector having a lateral brine inlet connected to said brine suction pipe and a Venturi tube delivering to the bottom of said container, a water supply nozzle projecting into said injector for longitudinal adjustment relative to said tube, and a valve in said cross fitting adapted in normal position to close the drain branch and container top branch and place said supply water branch and container bottom branch in communication, the valve in regenerating position closing said supply water branch and container bottom branch and placing said drain branch and container top branch in communication.

2. A water softening apparatus comprising a brine suction pipe, a water softening mineral container, a cross fitting having a branch connected to a drain, a branch connected to the bottom of said container, a branch connected to the top of said container, and a branch connected to a water supply, an injector having a brine inlet connected to said brine suction pipe and a Venturi tube delivering to the bottom of said container, a water supply nozzle projecting into said injector for adjustment relative to said tube, and a central valve in said cross fitting adapted in normal position to close the drain branch and container top branch, the valve in regenerating position closing said supply water branch and container bottom branch and placing said drain branch and container top branch in communication, a normally open soft water outlet valve adapted to be closed during regeneration, and a normally closed valve for said brine inlet adapted to be opened for regeneration, said injector being open at all times for the passage of supply water therethrough.

3. A water softening apparatus comprising a brine suction pipe, a water softening mineral container, a cross fitting having a branch connected to a drain, a branch connected to the bottom of said container, a branch connected to the top of said container, and a branch connected to a water supply, an injector having a brine inlet connected to said brine suction pipe and a Venturi tube delivering to the the bottom of said container, a water supply nozzle projecting into said injector, a central valve in said cross fitting adapted in normal position to close the drain branch and container top branch and place said supply water branch and container bottom branch in communication, the valve in regenerating position closing said supply water branch and container bottom branch and placing said drain branch and container top branch in communication, and a normally closed valve for said brine inlet adapted to be opened for regeneration.

4. A water softening apparatus comprising a tank having a suction pipe depending therein, a container, a cross fitting having a branch connected to a drain, a branch connected to the bottom of said container, a branch connected to the top of said container, and a branch connected to a water supply, an injector having a lateral inlet connected to said suction pipe and a Venturi tube delivering to the bottom of said container, a water supply nozzle projecting into said injector, and a valve in said cross fitting adapted in normal position to close the drain branch and container top branch and place said supply water branch and container bottom branch in communication, the valve in regenerating position closing said supply water branch and container bottom branch and placing said drain branch and container top branch in communication.

5. A water softening apparatus comprising a container having a service outlet at the top thereof, a cross fitting having a branch connected to a drain, a branch connected to the bottom of said container, a branch connected to the top of said container, and a branch connected to a water supply, and a valve in said cross fitting adapted in normal position to close the drain branch and the container top branch and place said supply water branch and said container bottom branch in communication, the valve in regenerating position closing said supply water branch and said container bottom branch and placing said drain branch and said container top branch in communication.

6. A water softening apparatus comprising a brine tank, a zeolite container, a cross fitting having one branch connected to a water supply, a second branch connected to the bottom of said container, a third branch connected to the top of said container, and a fourth branch connected to a drain, a central valve in said fitting having a passage adapted to place the water supply branch in communication with the container bottom branch, the passage placing the container top branch in communication with the drain branch when the valve is turned to another position, a T-fitting connected to the water supply branch, a brine injector having a lateral brine inlet and a Venturi tube delivering to the bottom of said container, a valved brine suction pipe connected to said brine inlet and depending into said brine tank, the T-fitting and the injector being spaced apart and axially offset, and a flexible offset pipe connected at its inlet end to said T-fitting and at its discharge end to said injector to provide a nozzle therein, the arrangement being such that the position of the nozzle may be adjusted relative to the Venturi tube to obtain the desired suction of the brine by changing the effective length of said offset pipe.

7. A water softening apparatus comprising a brine tank, a zeolite container, a brine injector having a lateral brine inlet and a Venturi tube delivering to the bottom of said container, a valved brine suction pipe connected to said brine inlet and depending into said brine tank, a flexible offset pipe connected at its discharge end to said injector to provide a nozzle therein, said pipe being slidable in said injector whereby the position of the nozzle may be adjusted relative to the Venturi tube to obtain the desired suction of the brine by changing the effective length of said offset pipe, and fluid supply means connected to the other end of said flexible pipe.

8. A water softening apparatus comprising a water softening mineral container, a cross fitting having one branch connected to a water supply, a second branch connected to one end of the container, a third branch connected to the other end of the container and a fourth branch connected to a drain, a central valve in said fitting having a passage adapted in one position to place the water supply in communication with one end of the container and in another position to place the other end of the container in communication with the drain, and an open injector by-pass around the valve and connecting the water supply to one end of the container.

9. A water softening system comprising a water softening mineral container, a cross fitting having four branches and a central valve provided with a passage adapted to close two of the branches of the fitting and connect the other two in one position and in another position to open the first two branches and connect the other two, the first two branches being connected to a water supply and to one end of the container, respectively, the other two branches being connected to the other end of the container and to a drain, respectively, an open by-pass around said valve between the first two branches, an injector in said by-pass, a brine suction pipe connected to said injector, and a valve in said suction pipe for controlling the admission of brine to said injector.

10. In a water softening apparatus, the combination of a brine tank and a water softening tank provided with a service outlet and a regenerating outlet at the top, a delivery pipe connected to the bottom of said water softening tank, a water supply pipe, a two-way valve adapted to connect said supply pipe with said delivery pipe or to open said regenerating outlet, a by-pass connecting said water supply pipe with said delivery pipe and including an injector casing having a valve connection to said brine tank, said injector casing having a Venturi discharge, and a flexible conduit projecting into said injector casing and adjustable therein to provide an adjustable injector nozzle, said by-pass being continuously open to the water supply.

11. In a water softening apparatus, the combination of a brine tank and a water softening tank provided with a service outlet and a regenerating outlet at the top, a delivery pipe connected to the bottom of said water softening tank, a water supply pipe, a two-way valve adapted to connect said supply pipe with said delivery pipe or to open said regenerating outlet, a by-pass connecting said supply pipe with said delivery pipe and including an injector casing having a valve connection to said brine tank, said injector having a Venturi discharge, and a flexible conduit projecting into said injector casing and slidably adjustable therein to provide an adjustable injector nozzle.

12. In a water softening apparatus, the combination of a brine tank and a water softening tank provided with a service outlet and a regenerating outlet at the top, a delivery pipe connected to the bottom of said water softening tank, a water supply pipe, a two-way valve adapted to connect said supply pipe with said delivery pipe or to open said regenerating outlet, and a by-pass open at all times and connecting said supply pipe with said delivery pipe and including an injector casing having a valve connection to said brine tank, said injector casing having a Venturi discharge.

DAVID B. GAUSS.